…

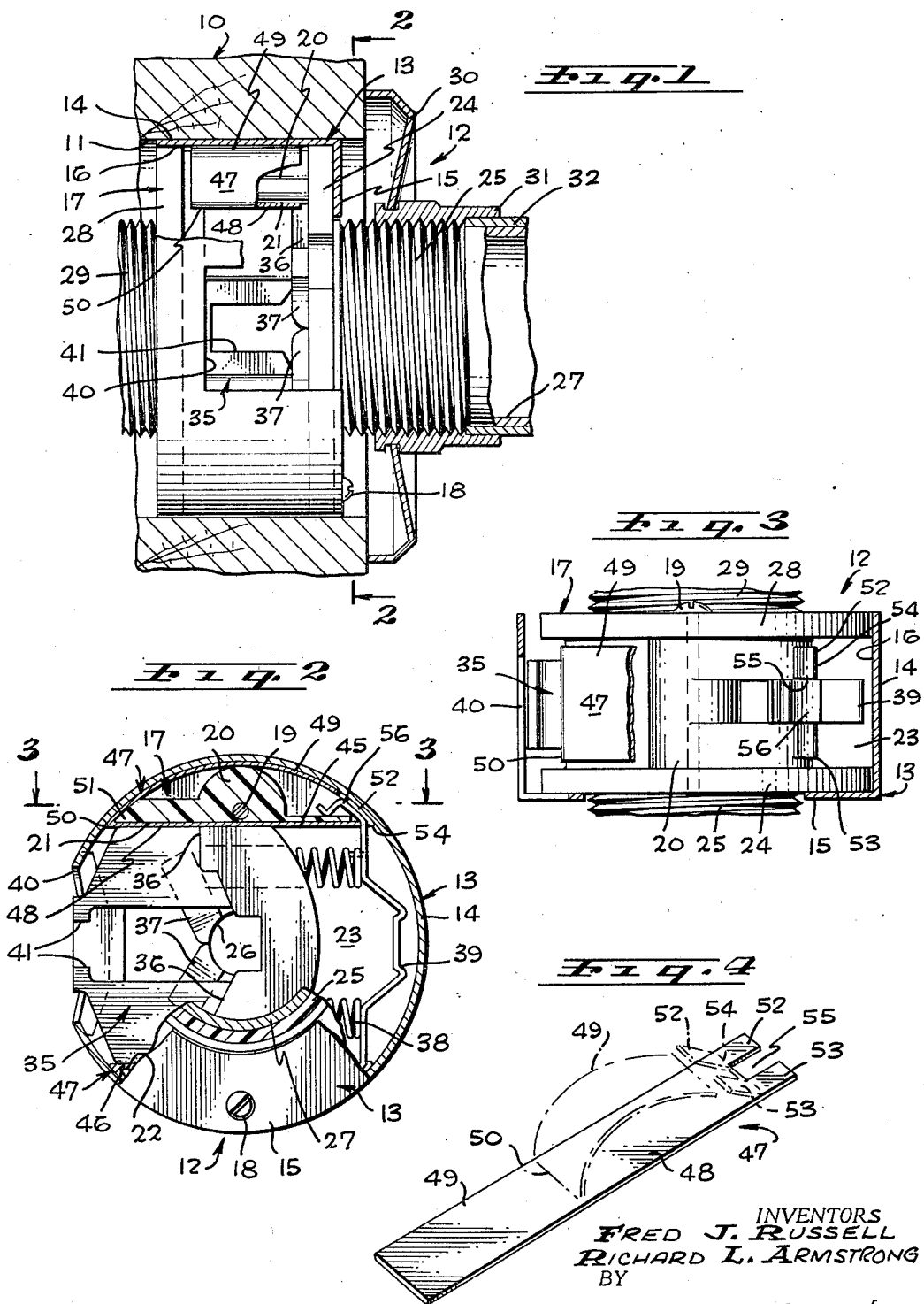

United States Patent Office 3,487,667
Patented Jan. 6, 1970

3,487,667
LOCK WITH METAL SHIM BETWEEN PLASTIC RETRACTOR SLIDE AND PLASTIC RETRACTOR CASE
Fred J. Russell, South Gate, and Richard L. Armstrong, Santa Fe Springs, Calif., assignors, by direct and mesne assignments, to Norris Industries, Inc., Los Angeles, Calif., a corporation of California
Filed Mar. 31, 1966, Ser. No. 541,462
Int. Cl. E05b *15/16*
U.S. Cl. 70—464   4 Claims

ABSTRACT OF THE DISCLOSURE

The invention resides in the provision of relatively moving parts of a lock device, namely a reciprocating retractor and a frame, the retractor being reciprocable relative to the frame. The breadth of the retractor is made smaller than the breadth of opposite inwardly facing surfaces in the frame whereby to provide a clearance, and a shim of material, unlike the material of the retractor, is placed in the clearance on each side. When the material of the shim is made different from the material of the retractor, as for example, when one is of metal and the other of a low friction synthetic plastic resin material, a sliding relationship is provided between unlike materials, thereby to reduce friction on the retractor during its movement.

---

The invention relates to locks. Those portions of a lock to which the invention applies are portions where two surfaces of incompatible material are required to slide against each other, making it advisable to provide some expedient for minimizing frictional resistance between them and for preventing wear and deterioration of the parts. The application is of special value in locks wherein a synthetic plastic resin material is employed and which accounts for the sliding surfaces of like material.

With the improvements in the character and quality of synthetic plastic resin materials of certain kinds, these materials have frequently been substituted for metal parts in locks. Most such substitutions are advantageous in that plastic parts are light weight, relatively inexpensive to manufacture, and capable of building into the lock mechanism a quiet, smooth-working operation, without the employment of lubricants. There are, however, limitations inherent in the plastic material, one being that where two frictionally engaging surfaces are substantially the same plastic material, the low-friction characteristics are not enjoyed to the fullest extent. There is also likelihood of such surfaces wearing or galling over protracted periods of use.

It is therefore among the objects of the invention to provide a new and improved lock structure wherein materials are used in face-to-face sliding relationship separated by an element of material dissimilar to the other moving part in order to improve the low-friction characteristics, to inhibit deterioration of the mutually sliding surfaces, and, at the same time, to preserve the advantages of parts which are made of synthetic plastic resin material.

Another object of the invention is to provide a new and improved lock structure which has the low-friction and related advantages of a metal-to-plastic relationship in a structure wherein a substantial number of the principal parts are made of synthetic plastic resin material.

Still another object of the invention is to provide a new and improved lock structure which employs a substantial portion of low-friction type material for its operating parts and wherein, by the incorporation of a limited amount of metallic material, the durability is greatly improved without an accompanying increase in cost and without need to depart from proven conventional structural principles.

With these and other objects in view, the invention consists in the construction, arrangement, and combination of the various parts of the device, whereby the objects contemplated are attained, as hereinafter set forth, and illustrated in the accompanying drawings.

In the drawings:

FIGURE 1 is a side elevational view of the lock structure mounted in a door with parts substantially broken away to reveal the interior construction.

FIGURE 2 is a cross-sectional view on the line 2—2 of FIGURE 1.

FIGURE 3 is a partial longitudinal sectional view on the line 3—3 of FIGURE 2.

FIGURE 4 is a perspective view of the special shim which is employed.

In an embodiment of the invention chosen for the purpose of illustration, there is shown a fragment of door 10 having an opening 11 therethrough in which is mounted a lock structure indicated generally by the reference character 12. The lock structure 12 includes a substantially cylindrical housing 13 which fits neatly and snugly within the opening 11. In the chosen embodiment, the housing 13 has a cylindrical wall 14 and a flat end wall 15. The housing 13 provides a chamber 16 in which is located a frame 17. Screws 18 and 19 extend through the flat end wall 15 into appropriate threaded engagement with portions 20 of frame 17, thereby to securely mount the frame 17 within the housing 13.

Parallel, inwardly facing plates 21 and 22 form slideways on the frame 17 and are spaced apart to form a space 23. An end wall 24 of the frame 17 interconnects opposite sides carrying the respective slideways 21 and 22, the end wall 24 being provided with a bearing 25 having a threaded exterior and having a cylindrical passage 26 therethrough to rotatably receive a spindle 27. A second end wall 28 may be provided on the opposite side for mounting a second bearing 29. An escutcheon 30 is held in position against the door 10 by means of a threaded sleeve 31, upon which it is mounted, the threaded sleeve 31 being adapted to be drawn against the door 10 when screwed inwardly along the bearing 25. A shank 32 of a substantially conventional knob (not shown) occupies a portion extending outwardly from the threaded sleeve 31.

In the space 23 within the frame 17 there is reciprocatably mounted a retractor 35. The retractor 35 is provided with shoulders 36 adapted to be engaged by rollbacks 37 forming part of the spindle 27, wherein, by rotation of the spindle 27, one or another of the rollbacks 37 is moved into engagement with the respective shoulder 36 to move the retractor 35 in a direction from left to right, as viewed in FIGURE 2, against tension of springs 38. The springs 38 are retained by spring keeper 39 which, in turn, engages over the exterior of the frame 17 within the chamber 16, as viewed to good advantage in FIGURE 2. An opening 40 on the opposite side of the housing 13 provides access to lips 41 of the retractor 35, which is the means by which the retractor 35 is attached to a substantially conventional latch bolt tailpiece (not shown).

On the retractor 35 are outwardly facing shoes 45 and 46, the shoe 45 being in face-to-face spaced relationship with the slideway 21 and the shoe 46 being in face-to-face spaced relationship with the slideway 22. There is a clearance in each instance between the shoe and the slideway relatively narrow in proportion to its width. Although in conventional construction, the frame and retractor are often constructed of metal, they are shown in the chosen embodiment as made of synthetic plastic resin material such, for example, as nylon or Delrin. As a consequence, the slideways 21 and 22 are of plastic material, and so are the shoes 45 and 46. In conventionally built lock structures, the shoes 45 and 46 normally engage the slideways in direct, slidable contact.

In the embodiment of the invention herein disclosed, shims are provided like the shim 47, shown in perspective, in FIGURE 4. When the retractor 35 is of synthetic plastic resin material, the shim 47 consists of a strip of metal having a portion 48 adapted to lie within the clearance between the shoe 45 and the slideway 21. Should the retractor 35 be of metal, the shim 47 would be constructed, in turn, of synthetic plastic resin material so as to be dissimilar from that of the retractor 35. When the strip is of metal, it employs another portion 49 bent along a fold line 50 with respect to the portion 48 and extends arcuately over the adjacent side of the frame 17 and engages the inside wall of the housing 13. A corner 51 of the frame 17 is engaged by the shim 47 inside the fold line 50, thereby to anchor the shim 47 in position. Tabs 52 and 53 at the opposite end of the portion 48 are also bent along a fold line 54, so as to overlie the corresponding adjacent portion of the frame 17, thereby to anchor the shim 47 to the frame 17 at that end also. An opening 55 between the tabs 52 and 53 accommodates an end 56 of the spring keeper 39. The same shim construction is employed on the opposite side of the frame 17 and retractor 35.

The clearance between the shoes 45, 46 and the respective slideways 21, 22 is substantially filled in each instance by the respective thickness of the shim 47, allowing only a very small tolerance. In this structure, a small tolerance can be tolerated because of the low-friction surface charactreistics of the slideways 21, 22 sliding as they do over the metal surfaces of the respective shim 47. The shim 47 provides a relatively broad sliding surface over which the respective slideways 21, 22 can slide. Because of the low-friction characteristics of the dissimilar materials (especially, plastic against metal), there is a free-sliding movement without there being need for any lubricant. Also, because of the presence of dissimilar materials, the disadvantages of frictional engagement of similar materials is avoided, such as would be the case if plastic slid against plastic, or, for that matter, if metal slid against metal. The presence of the metal shim 47 additionally avoids likelihood of the slideways 21, 22 wearing unduly, or pitting, such as might otherwise be the case. The shims 47, however, are very simply and inexpensively formed from thin gauge sheet metal, the principal requirement for them being the need for providing sufficient clearance, there being no need otherwise to vary the construction of substantially conventional parts of the lock. Mounting of the strip in the course of assembly of the lock parts requires no more than insertion of one end of the shim 47 into the clearance, after which opposite ends are then folded over on the fold lines referred to for retention in the chamber 16 of the housing 13. Should replacement every be needed, the replacement can be accomplished by merely separating the lock parts, withdrawing a defective shim 47, and replacing it with a new one.

While the invention has herein been shown and described in what is conceived to be the most practical and preferred embodiment, it is recognized that departures may be made therefrom within the scope of the invention.

Having described the invention, what is claimed as new in support of Letters Patent is:

1. In a lock structure, a relatively stationary frame member of selected material, a relatively moving retractor member of selected material mounted to slide in relationship to said frame member, an inwardly facing smooth slideway on said frame member, an outwardly facing smooth surfaced shoe in said retractor member spaced from said slideway by a relatively narrow clearance, and a separating shim comprising a single sheet of homogeneous material dissimilar from said retractor member located within said clearance and extending throughout the length and breadth of the clearance and slidable relative to said retractor member, said clearance being substantially filled by the thickness of said shim.

2. In a lock, a relatively stationary frame member, a relatively moving retractor member of metallic material mounted to slide in relationship to said frame member, an inwardly facing smooth slideway on said frame member, an outwardly facing smooth surfaced shoe on said retractor member spaced from said slideway by a relatively narrow clearance, and a separating shim comprising a single sheet of homogeneous synthetic plastic resin material located within said clearance and extending throughout the length and breadth of the clearance being substantially filled by the thickness of said shim.

3. A lock structure having a housing, a frame of selected material in said housing and a spindle having rollback means rotatably mounted in said housing, a retractor of like material relative to said frame and mounted to slide relative to said frame for operative engagement with the rollback means on said spindle, spaced parallel inwardly facing smooth slideways on said frame and complementary spaced parallel outwardly facing smooth surfaced shoes on said retractor, each shoe being spaced from the respective slideway by a relatively narrow clearance, and a separating shim comprising a single sheet of homogeneous material unlike said shoe located within each said clearance, said clearance being substantially filled by the thickness of said shim, each said shim comprising a strip having a portion lying in said clearance and extending throughout the length and breadth thereof and being in retained engagement with said frame.

4. A lock structure having a housing, a frame of synthetic plastic resin material in said housing and a spindle having rollback means rotatably mounted in said housing, a retractor of synthetic plastic resin material slidably mounted in relation to said frame for operative engagement with the rollback means on said spindle, spaced parallel inwardly facing smooth slideways on said frame and complementary spaced parallel outwardly facing smooth surfaced shoes on said retractor, each shoe being spaced from the respective slideway by a relatively narrow clearance, a separating metal shim located within each said clearance, said clearance being substantially filled by the thickness of said shim, each said shim comprising a metal strip having one portion lying in said clearance and another portion extending between the frame and the housing at a location overlying said one portion, and a releasable interlock between each said strip and said frame for retaining said portion in position.

References Cited

UNITED STATES PATENTS

| | | | |
|---|---|---|---|
| 2,733,088 | 1/1956 | Fisler et al. | 292—1 |
| 2,946,614 | 7/1960 | Russel | 292—341.11 |
| 3,126,217 | 3/1964 | Russell et al. | 292—1 |
| 3,156,495 | 11/1964 | Holden | 292—336.3 |
| 3,207,546 | 9/1965 | Ernest | 292—1 X |
| 3,287,047 | 11/1966 | Russell et al. | 292—169 |

RICHARD E. MOORE, Primary Examiner

R. L. WOLFE, Assistant Examiner

U.S. Cl. X.R.

292—1